United States Patent [19]

Dwyer

[11] 4,262,921
[45] Apr. 21, 1981

[54] TANDEM IMPLEMENT HITCH

[76] Inventor: Thomas L. Dwyer, Alexander, N. Dak. 58831

[21] Appl. No.: 23,030

[22] Filed: Mar. 21, 1979

[51] Int. Cl.³ .............................................. B60D 1/00
[52] U.S. Cl. ................................ 280/411 C; 172/679; 172/742; 280/468; 280/412
[58] Field of Search ............ 280/412, 411 C, 468–471, 280/462–467; 172/5, 6, 26, 742, 651, 679, 680

[56] References Cited

U.S. PATENT DOCUMENTS

| | | | |
|---|---|---|---|
| 1,125,323 | 1/1915 | Holmes | 280/466 |
| 1,939,460 | 12/1933 | Nelson | 172/651 |
| 2,981,345 | 4/1961 | Hamilton | 172/679 |
| 3,487,448 | 12/1969 | Stemmerman | 280/468 |
| 3,893,283 | 7/1975 | Dandl | 280/463 |
| 4,123,081 | 10/1978 | Ellinger | 280/463 |

*Primary Examiner*—John P. Silverstrim
*Attorney, Agent, or Firm*—Harvey B. Jacobson

[57] ABSTRACT

A generally horizontal forwardly opening U-shaped frame is provided including a pair of front to rear extending elongated opposite side members and a rear cross member extending and secured between the rear ends of the side members. The forward ends of the side members may be removably anchored to transversely spaced rear portions of a forward implement and an elongated front-to-rear extending draw bar is provided and pivot structure pivotally anchors the draw bar to the cross member for oscillation relative thereto about an upright axis disposed intermediate the opposite ends of said cross member and the front and rear ends of said draw bar. The front and rear ends of the draw bar project forwardly and rearwardly, respectively, of the cross member, the rear end of the draw bar may have a rear implement coupled thereto and a hydraulic cylinder is operatively connected between the front end of the draw bar and the frame for adjustably laterally shifting the draw bar front end and thus variably canting the draw bar. The pivot structure is operative to adjustably shift the axis of oscillation of the draw bar along the latter and thus lateral swinging of the rear end of the draw bar for a given extension or retraction of the hydraulic cylinder may be varied.

3 Claims, 3 Drawing Figures

TANDEM IMPLEMENT HITCH

BACKGROUND OF THE INVENTION

Various forms of implement hitches heretofore have been provided for use with tandem earthworking implements. However, most tandem implement hitches do not include structure whereby the rear implement of a tandem implement assembly may be shifted laterally relative to the forward implement thereof. Further, while some implement hitches are constructed in a manner whereby the implement trailed therebehind may be laterally shifted relative to the towing vehicle, in many instances a need arises for a tandem implement hitch operable to automatically limit lateral shifting of the rear implement.

Examples of hitch constructions including some of the general structural and operational features of the instant invention are disclosed in U.S. Pat. Nos. 1,210,735, 1,962,423, 1,998,032, 2,600,016, 2,992,660, 3,398,975 and 3,487,448.

BRIEF DESCRIPTION OF THE INVENTION

The tandem implement hitch of the instant invention is designed to be used in towing tandem groundworking implements and includes motor structure whereby the rear implement may be laterally shifted relative to the forward implement. In addition, the implement hitch includes structure whereby the lateral shifting of the rear implement relative to the forward implement may be limited, as desired.

The main object of this invention is to provide a tandem implement hitch which will enable the rear implement of a tandem implement assembly to be laterally shifted relative to the forward implement.

Another object of this invention is to provide a tandem implement hitch constructed in a manner whereby lateral shifting of the rear implement may be controlled from the hydraulic power supply of the towing vehicle.

Still another important object of this invention is to provide a tandem implement hitch including structure whereby the lateral shifting of the rear implement effected thereby may be limited as desired.

A final object of this invention to be specifically enumerated herein is to provide a tandem implement hitch in accordance with the preceding objects and which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE INVENTION

Figure 1:
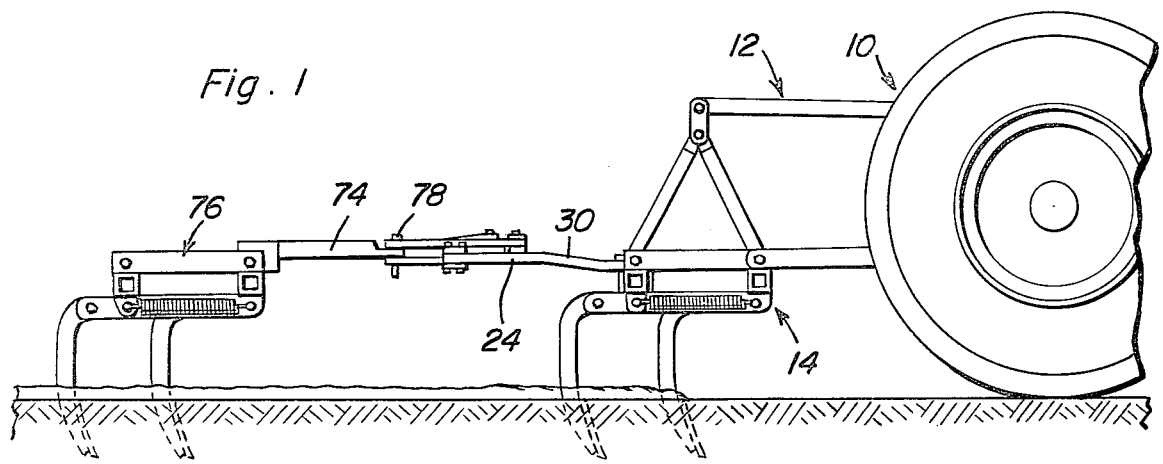
FIG. 1 is a side elevational view of the tandem implement hitch in use towing a rear implement behind a forward implement being drawn by a tractor.
Figure 2:
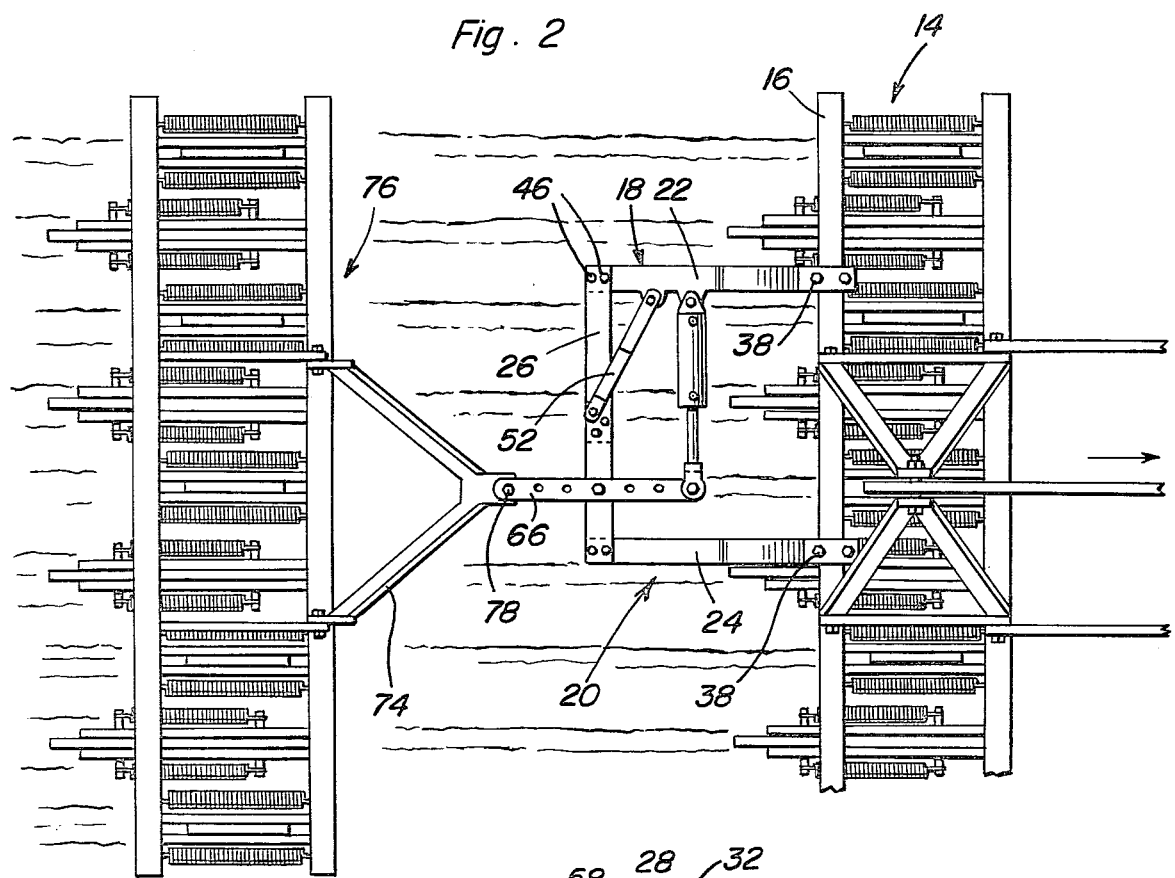
FIG. 2 is a fragmentary top plan view of the assemblage illustrated in FIG. 1.
Figure 3:
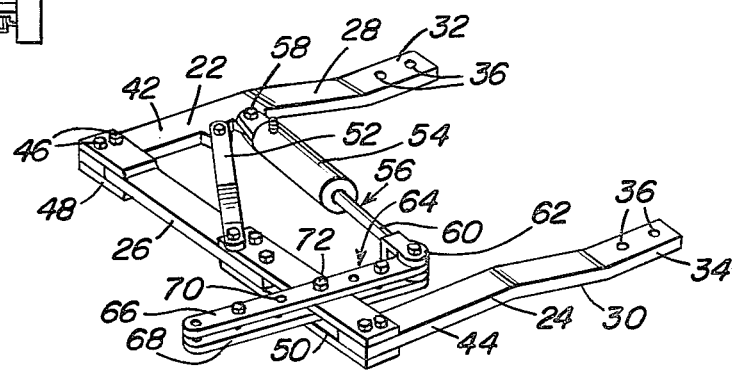
FIG. 3 is a perspective view of the implement hitch.

Referring now more specifically to the drawings, the numeral 10 generally designates a conventional form of tractor including a three-point hitch referred to in general by the reference numeral 12. A forward implement is referred to in general by the reference numeral 14 and is coupled to the three-point hitch 12 in the usual manner. The forward implement 14 includes a rear transverse frame member 16 and the implement hitch of the instant invention is referred to in general by the reference numeral 18 and is anchored to the rear frame member 16 in a manner to be hereinafter more fully set forth.

The hitch 18 comprises a generally horizontal U-shaped frame referred to in general by the reference numeral 20 and the frame 20 includes a pair of front to rear extending elongated opposite side members 22 and 24. A rear cross member 26 extends and is anchored between the rear ends of the opposite side members 22 and 24.

The opposite side members 22 and 24 include intermediate portions 28 and 30 which are forwardly and downwardly inclined and terminate in generally horizontal forward terminal ends 32 and 34. Each terminal end 32 and 34 includes a pair of longitudinally spaced vertical bores 36 formed therethrough and U-bolts 38 have their legs secured through the bores 36 and are utilized to anchor the forward terminal ends 32 and 34 to opposite side portions of the transverse frame member 16. The rear ends 42 and 44 of the opposite side members 22 and 24 are secured by fasteners 46 between bifurcated end portions 48 and 50 of the cross member 26 and a diagonal brace 52 is secured between the side member 22 and the midportion of the cross member 26.

The cylinder portion 54 of a hydraulic cylinder 56 is pivotally attached to the longitudinal midportion of the side member 22 as at 58 and the free end of the piston rod portion 60 of the hydraulic cylinder is pivotally attached, by means of a clevis 62, to the forward end of a draw bar referred to in general by the reference numeral 64. The draw bar 64 comprises vertically spaced bars 66 and 68 provided with pairs of longitudinally spaced registered bores 70 formed therethrough and a pivot fastener 72 is secured through one pair of bores 70 in the bars 66 and 68 and the bifurcated end of the cross member 26. The forward end of the draw bar 64 projects forwardly of the cross member 26 and the rear end of the draw bar 64 projects rearwardly of the cross member 26. The forward end of the towing frame 74 of a rear implement referred to in general by the reference numeral 76 is pivotally anchored between the rear ends of the bars 66 and 68 of the draw bar 64 by a suitable pivot fastener 78.

In operation, the hydraulic cylinder 56 may be utilized to cant the forward end of the draw bar 64 toward either the right or the left side of the hitch 18 thus canting the rear end of the draw bar 64 to the left or right. In this manner, the desired alignment of the rear implement 76 behind the front implement 14 may be effected.

By removing the pivot fastener 72 and longitudinally shifting the draw bar 64 relative to the cross member 26 and reinserting the pivot fastener in a different set of registered bores 70, the effective length of the forward end of the draw bar 64 may be varied and the effective length of the rear end of the draw bar 64 may be inversely varied. Therefore, the maximum right and left canting of the rear end of the draw bar 64 may be varied as desired.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. An implement hitch for tandem earthworking implements, said hitch including a generally horizontal forwardly opening U-shaped frame defining a pair of elongated opposite side members and a rear cross member extending and secured between rear ends of said side members, the forward ends of said side members including anchor means for anchoring to transversely spaced rear portions of a forward implement, an elongated front-to-rear extending draw bar, said draw bar and cross member including coacting pivot means for pivotally anchoring said draw bar to said cross member for oscillation relative thereto about an upright axis disposed intermediate the opposite ends of said cross member and the front and rear ends of said draw bar with the front and rear ends of said draw bar projecting forwardly and rearwardly, respectively, of said cross member, the rear end of said draw bar including means for pivotally attaching a rear implement thereto, and motor means operatively connected between the front end of said draw bar and said frame for adjustably laterally shifting said front end and thus variably canting said draw bar relative to a front-to-rear direction, said pivot means including means operative to adjustably shift said axis along said draw bar, said draw bar including longitudinally spaced vertical bores therethrough, said pivot means comprising a pivot fastener secured through a selected one of said bores and said cross member, said draw bar bores and pivot fastener comprising said means operative to adjustably shift said axis, inclined brace means secured between one side of said members at a point forward of said cross bar and said cross bar intermediate the opposite ends of the latter, said motor means comprising an elongated extendible motor having one end pivotally anchored relative to one of said side members and the other end pivotally anchored to the forward end of said draw bar.

2. The combination of claim 1 wherein said motor means comprises a hydraulic cylinder.

3. The combination of claim 1 wherein the forward ends of said side member include downwardly offset forward terminal ends, said means for anchoring said side members to said forward implement being carried by said forward terminal ends.

* * * * *